Jan. 1, 1957 C. E. LOMAX 2,776,340

INTERCOMMUNICATION SYSTEMS

Filed March 10, 1953 3 Sheets-Sheet 1

INVENTOR.
Clarence E. Lomax
BY
Smith, Olsen & Baird
Attys.

Jan. 1, 1957 C. E. LOMAX 2,776,340

INTERCOMMUNICATION SYSTEMS

Filed March 10, 1953 3 Sheets-Sheet 2

INVENTOR.
Clarence E. Lomax
BY
Smith, Olsen + Baird
Attys.

Jan. 1, 1957 C. E. LOMAX 2,776,340

INTERCOMMUNICATION SYSTEMS

Filed March 10, 1953 3 Sheets-Sheet 3

INVENTOR.
Clarence E. Lomax
BY
Smith, Olsen & Baird
Attys.

United States Patent Office 2,776,340

Patented Jan. 1, 1957

2,776,340

INTERCOMMUNICATION SYSTEMS

Clarence E. Lomax, Chicago, Ill., assignor to Automatic Electric Laboratories, Inc., Chicago, Ill., a corporation of Delaware Application March 10, 1953, Serial No. 341,489

10 Claims. (Cl. 179—1)

The present invention relates to telephone systems and more particularly to such systems of the intercommunication type.

It is the general object of the present invention to provide an intercommunication system of improved and simplified connection and arrangement that is exceedingly flexible in accommodating a variable number of stations in a ready manner.

Another object of the invention is to provide in an intercommunication system, an improved circuit arrangement wherein the supply of the transmission current to the telephone sets at the respective calling and called stations is governed by the operation of an answer key at the called station in order to eliminate unnecessary battery drain in conjunction with unanswered calls.

A further object of the invention is to provide in an intercommunication system a link common to the stations that embodies an improved arrangement of line conductors individual to the respective stations and of feed conductors common to the stations.

Further features of the invention pertain to the particular arrangement of the circuit elements of the system, whereby the above-outlined and additional operating features thereof are attained.

Figure 1:
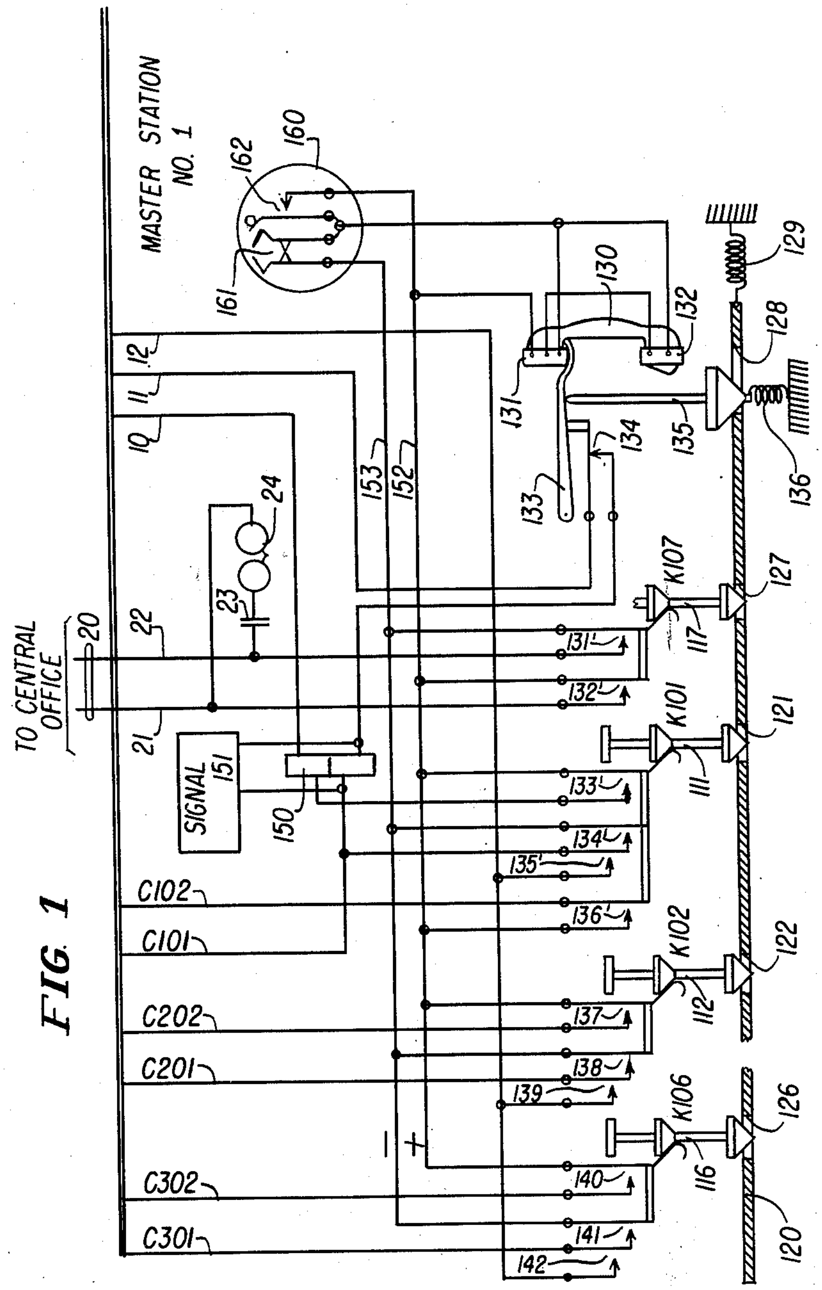
Figure 2:
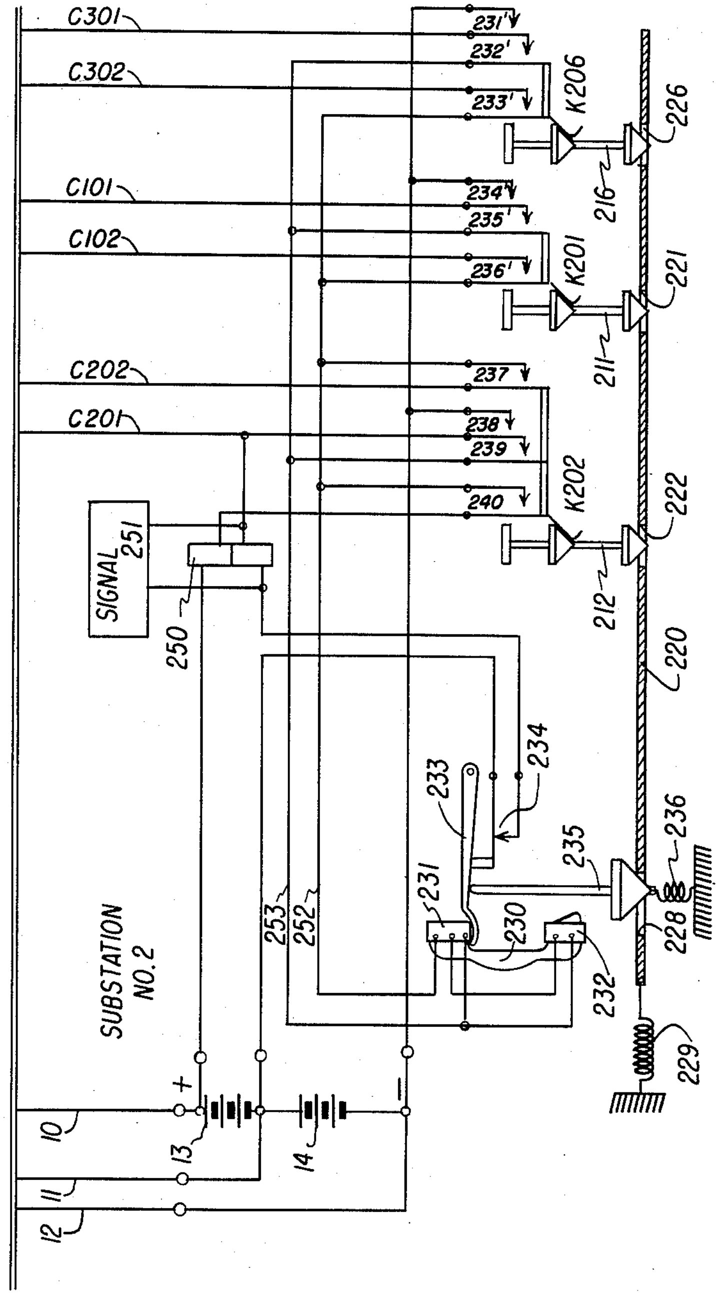
Figure 3:
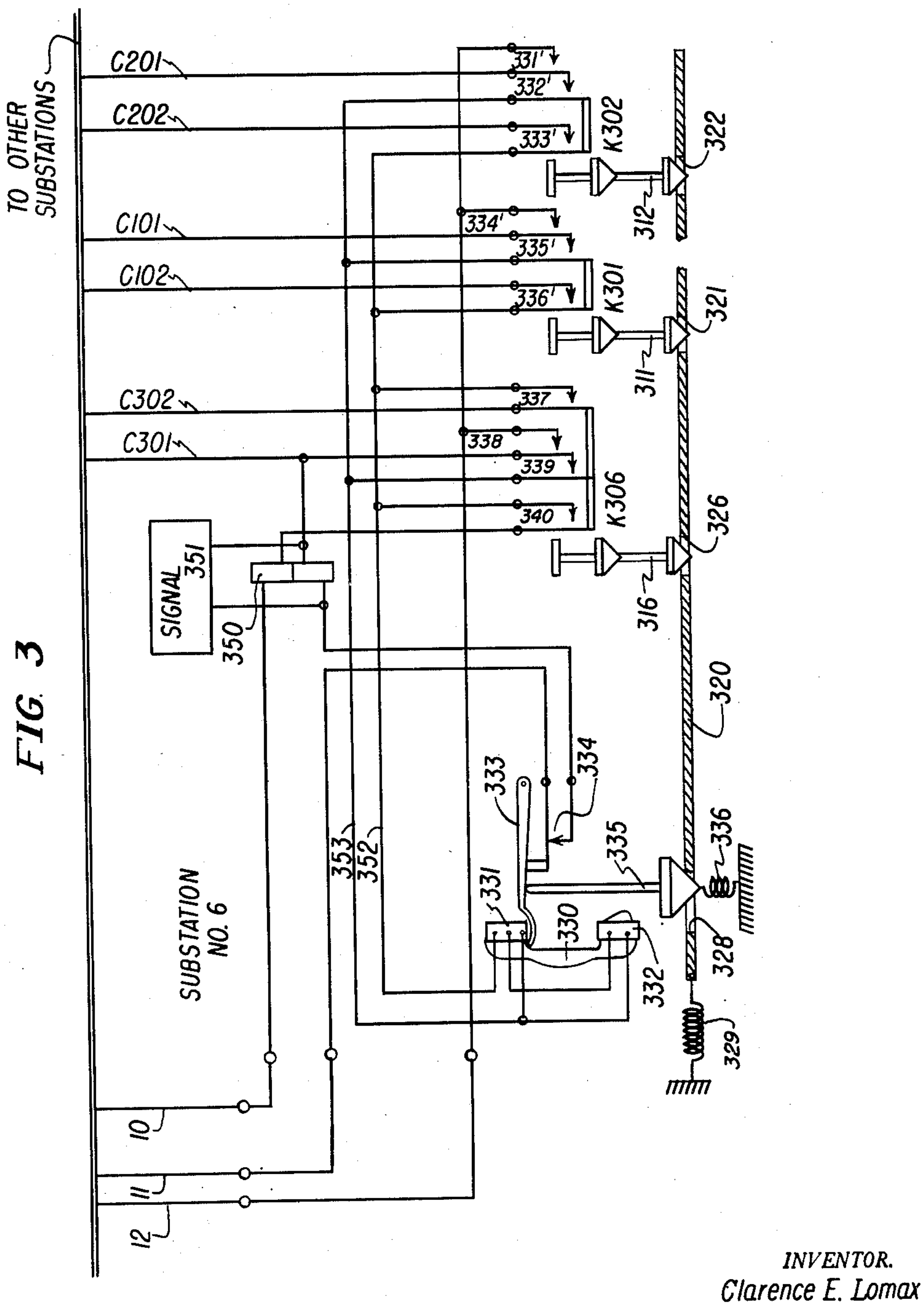

The invention, both as to its organization and method of operation, together with further objects and advantages thereof, will best be understood by reference to the following specification taken in connection with the accompanying drawings, in which Figures 1 to 3, inclusive, taken together, illustrate diagrammatically a telephone system of the intercommunication type and embodying the present invention;

Figs. 1 to 3, inclusive, should be arranged in sequence in end-to-end relation from left to right in order to form a unified diagram.

More particularly, in the intercommunication system, Figs. 1, 2 and 3, respectively illustrate principally the apparatus provided at stations No. 1, No. 2 and No. 6, station No. 1 constituting the master station and terminating a trunk line extending to a central office.

Referring now more particularly to Figs. 1 to 3, inclusive, the telephone system there illustrated is of the intercommunication type and embodies the features of the present invention. The intercommunication system comprises any suitable number of stations, six being indicated for purpose of disclosure, and stations No. 1, No. 2 and No. 6 being illustrated in detail, as previously noted. Specifically, the master station No. 1 terminates a trunk line 20 extending to a central office, not shown, and that is provided with a ringer 24. Also, the master station No. 1 includes a dial 160, a signal 151, an impedance 150 and a handset 130 provided with a receiver 131 of the three-terminal induction type and a transmitter 132, a hook switch 133 and key equipment. The key equipment consists of seven locking keys K101 to K107, inclusive, a master release plunger 135, and a locking plate 120. The master release plunger 135 is operatively interconnected between the hook switch 133 and the locking plate 120; while the keys K101, etc., are of the manually operable type and are operatively associated with the locking plate 120. In the arrangement, the key K101 comprises an answer key for the master station No. 1; while the keys K102, etc., comprise call keys for the corresponding substations No. 2, etc.; and finally, the key K107 comprises a trunk key for the central office trunk 20.

The substation No. 2 includes a signal 251, an impedance 250, a handset 230 provided with a receiver 231 of the three-terminal induction type and a transmitter 232, a hook switch 233 and key equipment. The key equipment consists of six locking keys K201 and K206, inclusive, a master release plunger 235 and a locking plate 220. The master release plunger 235 is operatively interconnected between the hook switch 233 and the locking plate 220; while the keys K201 etc., are of the manually operable type and are operatively associated with the locking plate 220. In the arrangement, the key K202 comprises an answer key for the substation No. 2; while the key K201 comprises a call key for the master station No. 1; and finally, the keys K206, etc., comprise call keys for the corresponding other substations No. 6, etc.

The substation No. 6 includes a signal 351, an impedance 350, a handset 330 provided with a receiver 331 of the three-terminal induction type and a transmitter 332, a hook switch 333 and key equipment. The key equipment consists of six locking keys K301 to K306, inclusive, a master release plunger 335 and a locking plate 320. The master release plunger 335 is operatively interconnected between the hook switch 333 and the locking plate 320; while the keys K301, etc., are of the manually operable type and are operatively associated with the locking plate 320. In the arrangement the key K306 comprises an answer key for the substation No. 6; while the key K301 comprises a call key for the master station No. 1; and finally, the keys K302, etc., comprise call keys for the corresponding other substations No. 2, etc.

Finally, the intercommunication system includes a link commonly extending between the master station No. 1, and the substations No. 2, etc., and including three common feed conductors 10, 11 and 12, and six pairs of line conductors C101—C102, C201—C202, etc., individual to the respective master station No. 1, substation No. 2, etc., as well as a battery including two sections 13 and 14 connected in series relation and provided with two outside terminals and a common inside terminal. In the arrangement, the two outside terminals may be respectively positive and negative and respectively connected to the feed conductors 10 and 12; while the inside terminal is of intermediate potential and connected to the feed conductor 11. Thus it will be understood that the potential of the battery section 13 is established between the feed conductors 10 and 11; and the potential of the battery section 14 is established between the feed conductors 11 and 12; whereas the accumulated potentials of the battery sections 13 and 14 are established between the feed conductors 10 and 12. Each of the battery sections 13 and 14 may be of 24-volts; whereby a potential 48-volts appears between the feed conductors 10 and 12. In the arrangement, the first pair of line conductors C101—C102 is individually terminated by the answer key K101 at the master station No. 1, and is commonly terminated by the call keys K201, K301, etc., at the respective substations No. 2, No. 6, etc. Similarly, the second pair of line conductors C201—C202 is individually terminated by the answer key K202 at the substation No. 2, and is commonly terminated by the call keys K102, K302, etc., at the respective master stations No. 1, substation No. 6, etc. Likewise, the sixth pair of line conductors C301—C302 is individually terminated by the answer key K306 at the substation No. 6, and is commonly terminated by the call keys K106, K206, etc., at the respective master station No. 1, substation No. 2, etc. Moreover, in the arrangement, the signal 151 at the master station No. 1 is connected across the lower winding of the impedance element 150; that, in turn, is connected across the feed conductor 11 and the line conductor C101 of the first pair of line conductors in the link via the contacts 134 of the hook switch 133, when the master station No. 1 is idle. Similarly, the signal 251 at the substation No. 2 is connected across the lower winding of the impedance element 250; that, in turn, is connected across the feed conductor 11 and the line conductor C201 of the second pair of line conductors in the link via the contacts 234 of the hook switch 233, when the substation No. 2 is idle. Likewise, the signal 351 at the substation No. 6 is connected across the lower winding of the impedance element 350; that, in turn, is connected across the feed conductor 11 and the line conductor C301 of the 6th pair of line conductors in the link via the contacts 334 of the hook switch 333, when the substation No. 1 is idle.

The connection and arrangement of the apparatus incorporated in the intercommunication ssytem will be better understood from the following description of the setting-up of various calls involving the stations illustrated.

First assuming that a call is to be extended from the master station No. 1 to the substation No. 2, the person at the master station No. 1 removes the handset 130 from the support of the hook switch 133; whereby the release plunger 135 is disengaged and the contacts 134 of the hook switch 133 are opened. Opening of the contacts 134 of the hook switch 133 effectively disconnects the signal 151 at the master station No. 1 from the feed conductor 11, thereby disabling the signal 151 for operation in conjunction with any call toward the master station No. 1. When the master plunger 135 is disengaged by the arm of the hook switch 133, it is moved by the coil spring 136 out of engagement in the opening 128 provided in the locking plate 120 so that the locking plate 120 is moved toward the right by the coil spring 129 for the purpose of establishing locking relation between the plunger 111, etc., carried by the keys K101, etc., and the respective openings 121, etc., provided in the locking plate 120. At this time, the locking plate 120 is conditioned to lock in place any one of the keys K101, etc., that is manually operated.

The person at the master station No. 1 then operates the key K102 individually corresponding to the substation No. 2; whereby the contacts 137, 138 and 139 thereof are closed and the plunger 112 thereof rides in the opening 122 provided in the locking plate 120. More particularly, the tapered head of the plunger 112 rides through the opening 122 provided in the locking plate 120 so that the locking plate 120 is first moved toward the left against the bias of the coil spring 129 and then moved toward the right by the coil spring 129; whereby the locking plate 120 locks the key K102 in its operated position. Closure of the contacts 137 and 138 of the key K102 connects the line conductors C201 and C202 to the respective positive and negative busses 152 and 153 at the master station No. 1 across which the handset 130 is connected. More particularly, the bus 152 is connected to the first terminal of the receiver 131; the second terminal of the receiver 131 is connected to the first terminal of the transmitter 132; the third terminal of the receiver 131 and the second terminal of the transmitter 132 are commonly connected to the intermediate terminal of the dial 160; and the busses 152 and 153 are respectively connected to the outside terminals of the dial 160. At this time, the intermediate terminal and left-hand terminal of the dial 160 are connected together via the impulsing contacts 161 thereof; whereby the handset 130 is operatively connected across the busses 152 and 153 and consequently across the second pair of line conductors C201 and C202 that extend via the link to the answer key K202 at the substation No. 2. Also closure of the contacts 139 of the call key K102 connects the feed conductor 12 to the line conductor 201 of the second pair thereby completing a signal circuit to the feed conductor 11 through the lower winding of the impedance 250 and the contacts 234 of the hook switch 233 at the substation No. 2, assuming that the substation No. 2 is idle at this time. The signal 251 at the substation No. 2 is connected across the lower winding of the impedance element 250, whereby it is operated at this time in the above-traced completed signal circuit. Operation of the signal 251 at the substation No. 2 indicates to the person thereat that a call is directed thereto.

In order to answer the call, the person at the substation No. 2 first removes the handset 230 from the support of the hook switch 233; whereby the release plunger 235 releases the locking plate 220 so as to condition the keys K201, etc., to be locked in their operated positions when they are operated thereto. Also, the contacts 234 of the hook switch 233 are opened in order to interrupt the above traced signal circuit for the signal 251. The person at the substation No. 2 then operates the answer key K202, whereby it is locked in its operated position by the locking plate 220, in the manner previously explained. Operation of the answer key K202 effects closure of the contacts 237, 238, 239 and 240 thereof. At the substation No. 2 the receiver 231 and the transmitter 232 of the handset 230 are operatively connected across the busses 252 and 253, in the manner previously explained. Closure of the contacts 237 and 239 of the answer key K202 operatively connects the busses 252 and 253 to the line conductor C202 and C201 respectively; closure of the contacts 238 connects the feed conductor 12 to the line conductor C201; while closure of the contacts 240 connects the bus 252 to the feed conductor 10 via the upper winding of the impedance element 250. Accordingly, at this time, the handset 230 at the substation No. 2 is operatively connected across the line conductors C201 and C202 and the battery sections 13 and 14 are operatively connected across the line conductors C201 and C202; whereby transmission current is supplied to both the handset 130 at the calling master station No. 1 and the handset 230 at the called substation No. 2. The circuit for supplying transmission current to the handsets 130 and 230 at the master station No. 1 and at the substation No. 2 includes the contacts 237 and 240 of the operated answer key K202 at the called substation No. 2. At this time, an established connection is completed between the calling master station No. 1 and the called substation No. 2 so that communication in either direction may proceed between the persons thereat.

At the conclusion of the established connection, the person at the master station No. 1 returns the handset 130 to the support of the hook switch 133; and the person at the substation No. 2 returns the handset 230 to the support of the hook switch 233. When the handset 130 is thus replaced with respect to the hook switch 133, the release plunger 135 is depressed returning the locking plate 120 against the bias of the coil spring 129 into its release position so that any one of the operated keys K101, etc., is released and returned back into its normal position, the operated call key K102 being released and returned back into its normal position in the present example. When the handset 230 is thus replaced with respect to the hook switch 233, the release plunger 235 is depressed returning the locking plate 220 against the bias of the coil spring 229 into its release position so that any one of the operated keys K201, etc., is released and returned back into its normal position, the operated answer key K202 being released and returned back into its normal position, in the present example.

Also the contacts 134 of the hook switch 133 are reclosed in order again to enable the signal 151 at the master station No. 1; and the contacts 234 of the hook switch 233 are reclosed in order again to enable the signal 251 at the substation No. 2. When the call key K102 is thus returned into its normal position, the contacts 137, 138 and 139 are opened so as to disconnect the handset 130 at the master station No. 1 from the second pair of line conductors C201—C202 in the link; and when the answer key K202 is thus returned into its normal position, the contacts 237, 238, 239 and 240 are opened so as to disconnect the handset 230 at the substation No. 2 from the second pair of line conductors C201—C202 in the link. Also, the restoration of the answer key K202 at the substation No. 2 disconnects the battery sections 13 and 14 from the second pair of line conductors C201—C202 in the link; whereby at this time the apparatus at the master station No. 1 and the apparatus at the substation No. 2 have been returned back into their normal idle positions.

In view of the above description of the manner in which a call initiated at the master station No. 1 is answered at the substation No. 2, it will be understood that in an identical manner, a call may be initiated at any of the stations to any other of the stations and answered thereat in an identical manner; and in any case the supply of transmission current to the telephone handsets at the calling and called stations is completed by operation of the answer key at the called station.

Reconsidering the established connection between the calling master station No. 1 and the called substation No. 2, it is noted that at this time the person at another calling substation may attempt to extend a call therefrom to either the calling master station No. 1 or to the called substation No. 2 involved in the previously-mentioned established connection. For example, the person at the calling substation No. 6 may, at this time, attempt to extend a call therefrom to the master station No. 1 involved as the calling station in the previously established connection mentioned above by operating the corresponding call key K301 after removal of the handset 330 from the support of the hook switch 333. The call key K301 is locked into its operated position and connects the handset 330 to the first pair of line conductors C101—C102 in the link that are terminated by the answer key K101 at the master station No. 1. However, since the answer key K101 at the master station No. 1 occupies its normal position no connection is completed to the handset 130 thereat; and moreover the signal 151 at the master station No. 1 is not operated since the handset 130 thereat has been removed from the support of the associated hook switch 133 opening the contacts 134. Accordingly, at this time, the operation of the call key K301 at the substation No. 6 corresponding to the master station No. 1 involved as the calling station in the previously established connection is without effect; whereby the person at the calling substation No. 6 then returns the handset 330 thereat upon the support of the hook switch 333 so as to cause the release plunger 335 to control the locking plate 320 in order to bring about the restoration of the call key K301 into its normal position, in the manner previously explained.

On the other hand, the person at the calling substation No. 6 may, at this time, attempt to extend a call therefrom to the substation No. 2 involved as the called station in the previously established connection mentioned above by operating the corresponding call key K302 after removal of the handset 330 from the support of the hook switch 333. The call key K302 is locked into its operated position and connects the handset 330 to the second pair of line conductors C201—C202 in the link that are terminated by both the operated call key K102 at the master station No. 1 and by the operated answer key K202 at the substation No. 2. However, the signal 251 at the substation No. 2 is not operated since the handset 230 thereat has been removed from the support of the associated hook switch 233, opening the contacts 234. Accordingly, at this time, the handset 330 at the calling substation No. 6 is connected in multiple to the handset 230 at the called substation No. 2 and to the handset 130 at the calling master station No. 1 involved in the above-described connection so that a three-way communication connection is completed, transmission current being supplied to the handset 330 at the calling substation No. 6 from the battery sections 13 and 14 via the operated contacts 240, 237 and 238 of the operated answer key K202 at the called substation No. 2.

In view of the foregoing, it will be appreciated that when a calling third station extends a call to a calling first station involved in a completed connection to a called second station, the call from the calling third station is not completed; whereas when a calling third station extends a call to a called second station involved in a completed connection from a calling first station the call is completed.

The person at the master station No. 1 may also initiate and answer calls with respect to the central office, not shown, via the central office trunk 20 and utilizing the trunk key K107. Specifically, in the event of an incoming central office call to the master station No. 1, the ringer 24 is operated over the trunk line 20; whereby the person at the master station No. 1 removes the handset 130 from the support of the hook switch 133 and operates the trunk key K107. This operation of the trunk key K107 effectively connects the handset 130 to the trunk line 20 without reference to the battery sections 13 and 14 so that transmission current is supplied to the handset 130 from the central office over the trunk line 20 in a conventional manner. The trunk key K107 is retained in its operated position by the locking plate 120, in the manner previously described. At the conclusion of the established connection, the handset 130 is returned to the support of the hook switch 133 so that the release plunger 135 effects the restoration of the trunk key K107 to its normal position so that the handset 130 is disconnected from the trunk line 20 again rendering the apparatus at the master station No. 1 in its normal idle condition.

In order to initiate a call to the central office, not shown, from the master station No. 1, the person thereat removes the handset 130 from the support of the hook switch 133, operates the trunk key K107, and then manipulates the dial 160 in accordance with the required directory number. Again, the trunk key K107 is retained in its operated position by the locking plate 120 and the handset 130 is operatively connected across the trunk 20 via the dial 160. When the dial 160 is manipulated, the shunt contacts 162 are closed to short the receiver 131 between the terminals No. 1 and No. 3 thereof so as to prevent clicks in the receiver 131, and the impulsing contacts 161 are opened and closed in accordance with the impulses of the digit to effect the transmission thereof over the trunk 20 to the central office. At the conclusion of the established connection, the person at the master station No. 1 again returns the handset 130 upon the support of the hook switch 133 effecting the release of the trunk key K107 and the consequent release of the trunk 20 extending to the central office; whereby the apparatus at the master station No. 1 is again returned to its normal idle condition.

In view of the foregoing, it is apparent that there has been provided a telephone system of the intercommunication type of simple connection and arrangement permitting great flexibility as to the number of stations involved and allowing any one of the stations to serve as a master station with reference to an associated central office.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an intercommunication system including a plurality of stations, a link common to said stations, and a battery; each of said stations including a handset, a support for said handset, a switch selectively controlled by placement and removal of said handset with respect to said support, a signal, an answer key, and a plurality of call keys respectively corresponding to the other of said stations; means controlled by the operation at a calling station of the call key corresponding to a called station for connecting the handset at said calling station to said link and for completing a signal circuit from said battery over said link to the signal at said called station, means controlled by the operation of the switch at said called station incident to the removal of the handset from the support thereat for interrupting said signal circuit, and means controlled by the operation of the answer key at said called station for connecting the handset thereat to said link and for completing parallel transmission circuits from said battery over said link to the handset at said calling station and to the handset at said called station so as to render operative the two handsets named.

2. The intercommunication system set forth in claim 1, wherein each of said stations also includes means controlled by the replacement of the handset upon the support thereat for restoring any operated key thereat.

3. In an intercommunication system including a plurality of stations, a link common to said stations, and a battery; each of said stations including a handset, a support for said handset, a switch selectively controlled by placement and removal of said handset with respect to said support, a signal, a manually operable answer key, a plurality of manually operable call keys respectively corresponding to the other of said stations, a latch, means controlled by the removal of said handset from said support for setting said latch to retain in its operated position any one of said keys manually operated from its normal position, and means controlled by the replacement of said handset upon said support for tripping said latch to release back into its normal position any one of said keys occupying its operated position; means controlled by the operation at a calling station of the call key corresponding to a called station for connecting the handset at said calling station to said link and for completing a signal circuit from said battery over said link to the signal at said called station, means controlled by the operation of the switch at said called station incident to the removal of the handset from the support thereat for interrupting said signal circuit, and means controlled by the operation of the answer key at said called station for connecting the handset thereat to said link and for connecting said battery to said link to supply transmission current therefrom over said link to the handset at said calling station and to the handset at said called station in parallel relation.

4. In an intercommunication system including a plurality of stations, a link common to said stations, and a battery; each of said stations including a handset, a support for said handset, a switch selectively controlled by placement and removal of said handset with respect to said support, a signal, an answer key, and a plurality of call keys respectively corresponding to the other of said stations; means including first contacts of an operated call key at a calling station for connecting the handset thereat to said link, means including second contacts of the operated call key at said calling station for completing a signal circuit from said battery over said link to the signal at the called station corresponding to the operated call key, means controlled by the operation of the switch at said called station incident to the removal of the handset from the support thereat for interrupting said signal circuit, means including first contacts of the operated answer key at said called station for connecting the handset thereat to said link, and means including second contacts of the operated answer key at said called station for completing parallel transmission circuits from said battery over said link to the handset at said calling station and to the handset at said called station so as to render operative the two handsets named.

5. In an intercommunication system including a plurality of stations, a link common to said stations, and two battery sections connected in series relation and having individual outside terminals and a common inside terminal; each of said stations including a handset, a support for said handset, a switch selectively controlled by placement and removal of said handset with respect to said support, a signal, an answer key, and a plurality of call keys respectively corresponding to the other of said stations; means controlled by the operation at a calling station of the call key corresponding to a called station for connecting the handset at said calling station to said link and for completing a signal circuit between one of said outside terminals and said inside terminal over said link to the signal at said called station, the signal at said called station being normally connected to said inside terminal, means controlled by the operation of the switch at said called station incident to the removal of the handset from the support thereat for disconnecting the signal at said called station from said inside terminal to interrupt said signal circuit, and means controlled by the operation of the answer key at said called station for connecting the handset thereat to said link and for connecting said outside terminals to said link in order to complete parallel transmission circuits from said two battery sections in series relation over said link to the handset at said calling station and to the handset at said called station so as to render operative the two handsets named.

6. In an intercommunication system including a plurality of stations, a link common to said stations, and a battery; said link including a plurality of pairs of line conductors individual to said stations and three feed conductors common to said stations; said battery including two sections connected in series relation and having individual outside terminals and a common inside terminal; one of said outside terminals and said inside terminal and the other of said outside terminals being respectively connected to first and second and third of said three feed conductors; each of said stations including a handset, a support for said handset, a switch selectively controlled by placement and removal of said handset with respect to said support, a signal, an answer key, and a plurality of call keys respectively corresponding to the other of said stations; means controlled by the operation at a calling station of the call key corresponding to a called station for connecting the handset at said calling station across the pair of line conductors individual to said called station and for completing a signal circuit from one of said battery sections over said first and second feed conductors and one of the line conductors of said last-mentioned pair to the signal at said called station, the signal at said called station being normally connected across said second feed conductor and said one line conductor of said last-mentioned pair, means controlled by the operation of the switch at said called station incident to the removal of the handset from the support thereat for disconnecting the signal at said called station from said second feed conductor to interrupt said signal circuit, and means controlled by the operation of the answer key at said called station for connecting the handset thereat across said line conductors of said last-mentioned pair and for connectting said first and third feed conductors respectively to said line conductors of said last-mentioned pair to supply transmission current from said two battery sections in series relation to the handset at said calling station and to the handset at said called station in parallel relation.

7. In a telephone system including a master station and plurality of other stations, a trunk line extending to said master station, a link common to said stations, and a battery; each of said stations including a handset, a support for said handset, a switch selectively controlled by placement and removal of said handset with respect to said support, a signal, an answer key, and a plurality of call keys respectively corresponding to the other of said stations; said master station also including a trunk key; means controlled by operation of said trunk key for connecting the handset at said master station to said trunk line, means controlled by the operation at a calling station of the call key corresponding to a called station for connecting the handset at said calling station to said link and for completing a signal circuit from said battery over said link to the signal at said called station, means controlled by the operation of the switch at said called station incident to the removal of the handset from the support thereat for interrupting said signal circuit, and means controlled by the operation of the answer key at said called station for connecting the handset thereat to said link and for completing parallel transmission circuits from said battery over said link to the handset at said calling station and to the handset at said called station so as to render operative the two handsets named.

8. The telephone system set forth in claim 7, wherein each of said stations further includes means controlled by the replacement of the handset upon the support thereat for restoring any operated key thereat.

9. In an intercommunication system including a plurality of stations, a link common to said stations, and a battery; each of said stations including a handset, a support for said handset, a switch selectively controlled by placement and removal of said handset with respect to said support, a signal, an answer key, and a plurality of call keys respectively corresponding to the other of said stations; said link including a plurality of pairs of line conductors respectively corresponding to said stations; each of said pairs of line conductors being individually terminated by the answer key at the station to which it corresponds and commonly terminated by the corresponding call keys at the other of said stations; the call key at a calling first station that corresponds to a called second station being operative to connect the handset at said first station to the corresponding second pair of line conductors in said link and to complete a signal circuit from said battery over one of said second pair of line conductors in said link to the signal at said second station, the switch at said second station being operative incident to the removal of the handset from the support thereat to interrupt said signal circuit, the answer key at said second station being operative to connect the handset thereat to said second pair of line conductors in said link and to connect said battery to said second pair of line conductors in said link so as to supply transmission current therefrom over said second pair of line conductors in said link to the handset at said first station and to the handset at said second station in parallel relation.

10. In an intercommunication system including a plurality of stations, a link common to said stations, and a battery; each of said stations including a handset, a support for said handset, a switch selectively controlled by placement and removal of said handset with respect to said support, a signal, an answer key, and a plurality of call keys respectively corresponding to the other of said stations; means controlled by the operation at a calling first station of the call key corresponding to a called second station for connecting the handset at said calling first station to said link and for completing a signal circuit from said battery over said link to the signal at said called second station, means controlled by the operation of the switch at said called second station incident to the removal of the handset from the support thereat for interrupting said signal circuit, means controlled by the operation of the answer key at said called second station for connecting the handset thereat to said link and for connecting said battery to said link to supply transmission current therefrom over said link to the handset at said calling first station and to the handset at said called second station in parallel relation, means controlled by the operation at a calling third station of the call key corresponding to said called second station for connecting the handset at said calling third station to said link with the supply of transmission current thereto from the completed connection between said calling first station and said called second station, and means controlled by the operation at said calling third station of the call key corresponding to said calling first station for connecting the handset at said calling third station to said link without the supply of transmission current thereto from the completed connection between said calling first station and said called second station.

References Cited in the file of this patent

UNITED STATES PATENTS

| | | |
|---|---|---|
| 1,325,347 | Booth | Dec. 16, 1919 |
| 2,009,470 | Auth | July 30, 1935 |
| 2,181,715 | Waite | Nov. 28, 1939 |
| 2,565,192 | Adler | Aug. 21, 1951 |